C. B. YAW.
TYPE WRITING MACHINE.
APPLICATION FILED FEB. 15, 1908.

1,009,371.

Patented Nov. 21, 191
8 SHEETS—SHEET 2.

WITNESSES:
E. M. Wells
mw Pool

INVENTOR.
Chas. B. Yaw
By Jacob Felbel
HIS ATTORNEY

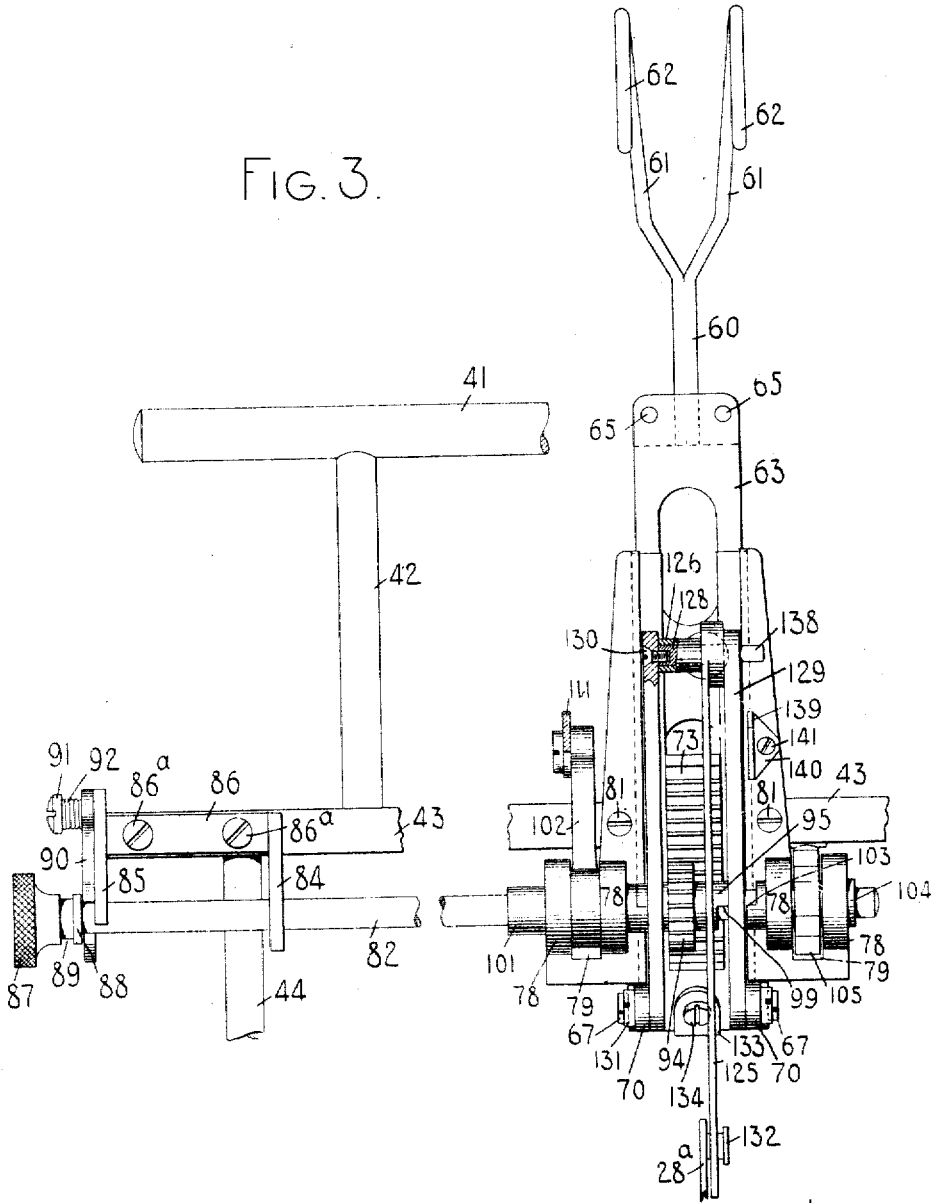

C. B. YAW.
TYPE WRITING MACHINE.
APPLICATION FILED FEB. 15, 1908.
1,009,371.
Patented Nov. 21, 1911.
8 SHEETS—SHEET 4.
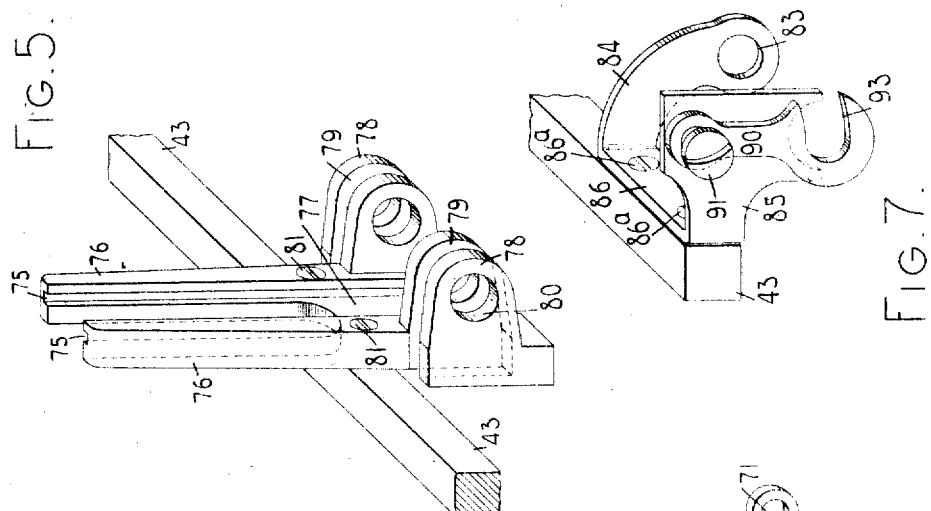
WITNESSES:
E. M. Wells
M. W. Pool
INVENTOR
Chas. B. Yaw
By Jacob Felbel
HIS ATTORNEY

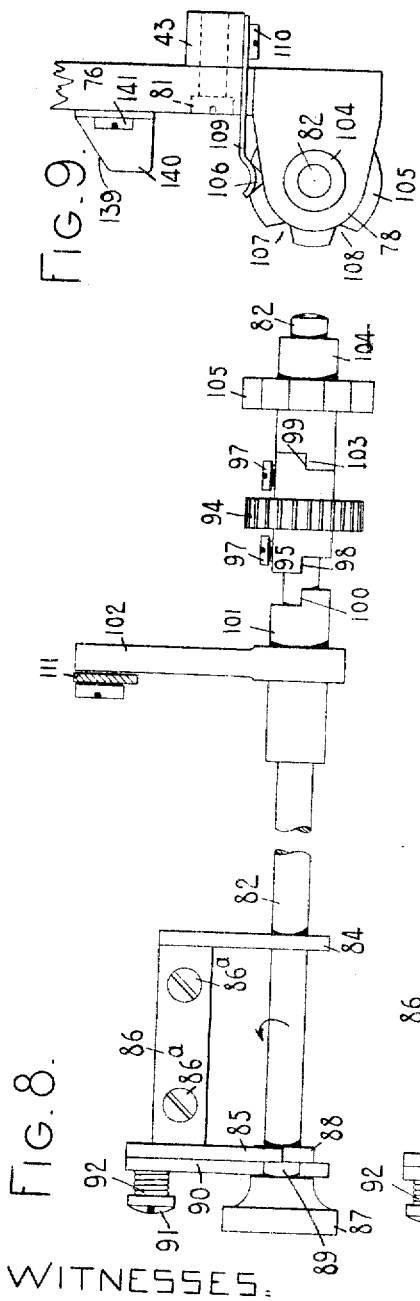
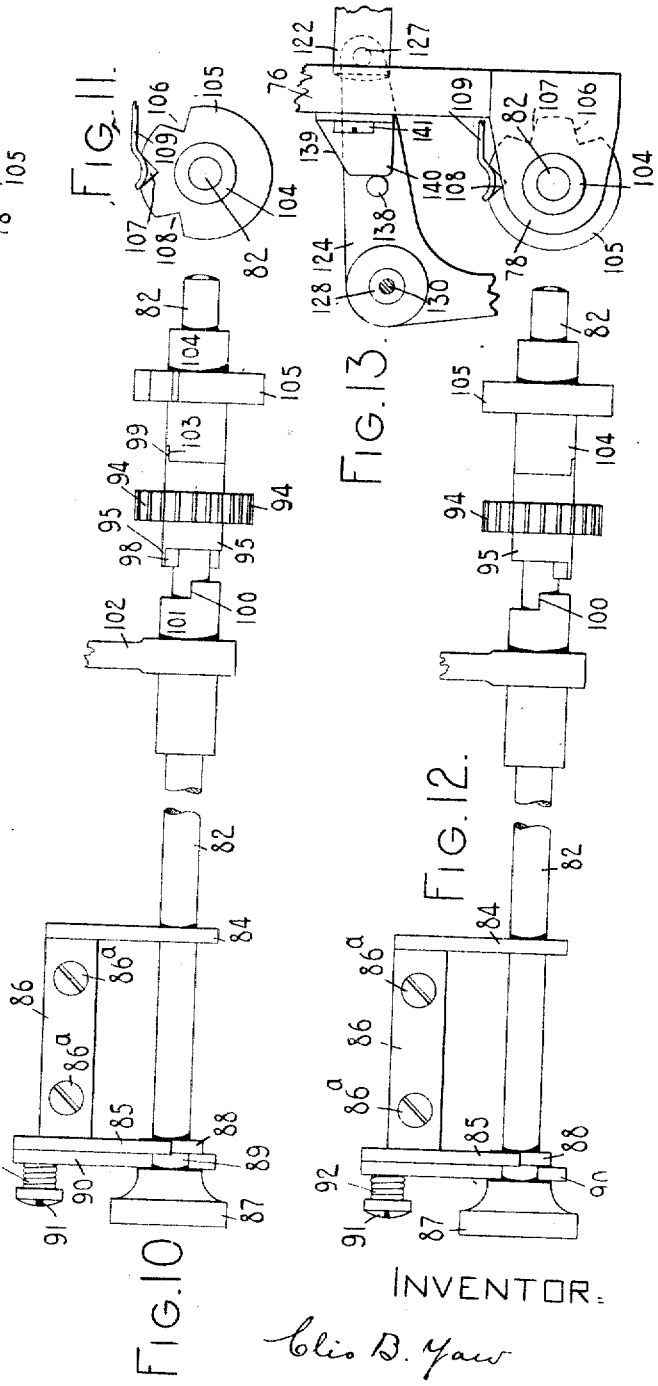

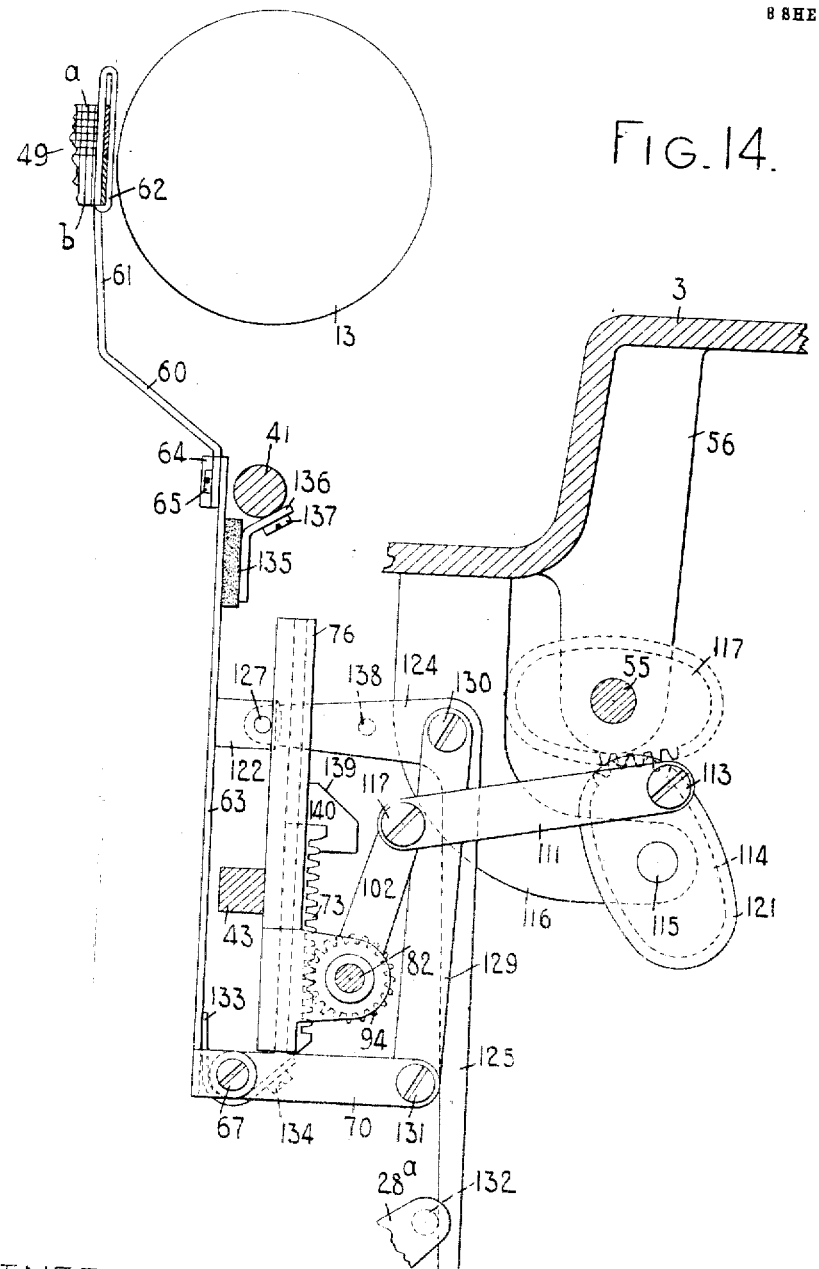

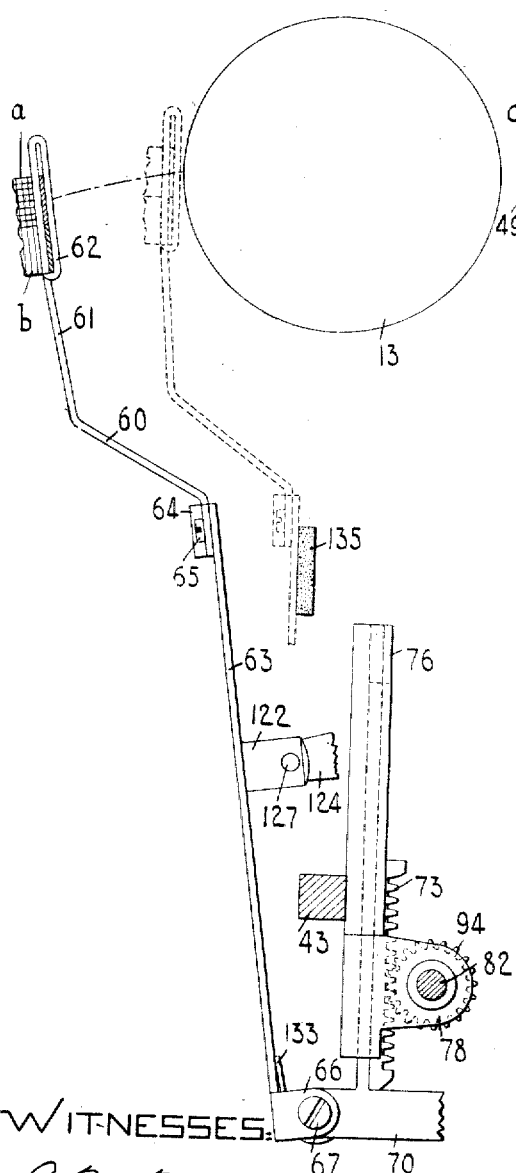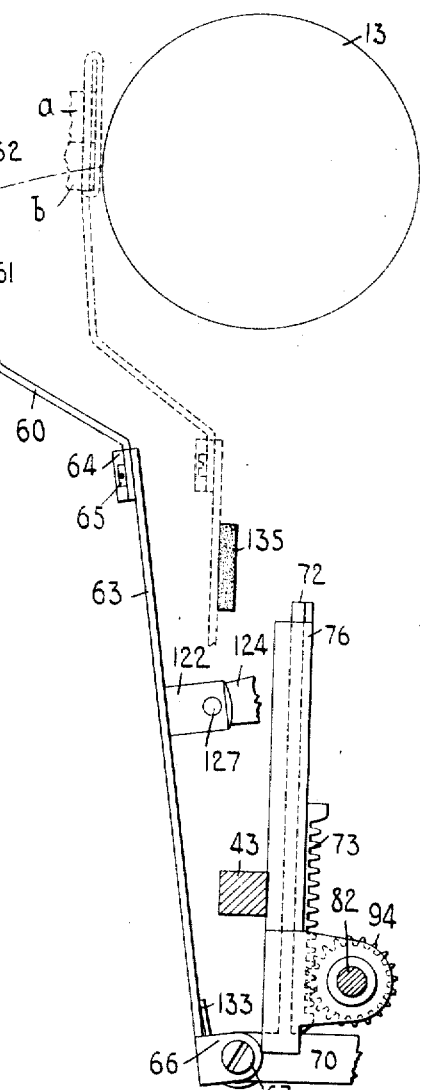

C. B. YAW.
TYPE WRITING MACHINE.
APPLICATION FILED FEB. 15, 1908.

1,009,371.

Patented Nov. 21, 1911.
8 SHEETS—SHEET 8.

UNITED STATES PATENT OFFICE.

CLIO B. YAW, OF ARLINGTON, NEW JERSEY, ASSIGNOR TO WYCKOFF, SEAMANS & BENEDICT, OF ILION, NEW YORK, A CORPORATION OF NEW YORK.

TYPE-WRITING MACHINE.

1,009,371.  Specification of Letters Patent.  Patented Nov. 21, 1911.

Application filed February 15, 1908. Serial No. 416,080.

*To all whom it may concern:*

Be it known that I, CLIO B. YAW, citizen of the United States, and resident of Arlington, in the county of Hudson and State of New Jersey, have invented certain new and useful Improvements in Type-Writing Machines, of which the following is a specification.

My invention relates particularly to ribbon mechanism for typewriting machines and its object, generally stated, is to provide improved devices of the class specified.

To the above and other ends which will hereinafter appear, the invention consists in the features of construction, combinations of devices and arrangements of parts hereinafter described and particularly pointed out in the claims.

The invention is shown as applied to a typewriting machine of the front-strike kind or class and having a shifting platen, but it is to be understood that said invention may be applied in whole or in part to other forms of writing machines.

One form of the invention is illustrated in the accompanying drawings, wherein—

Figure 1:
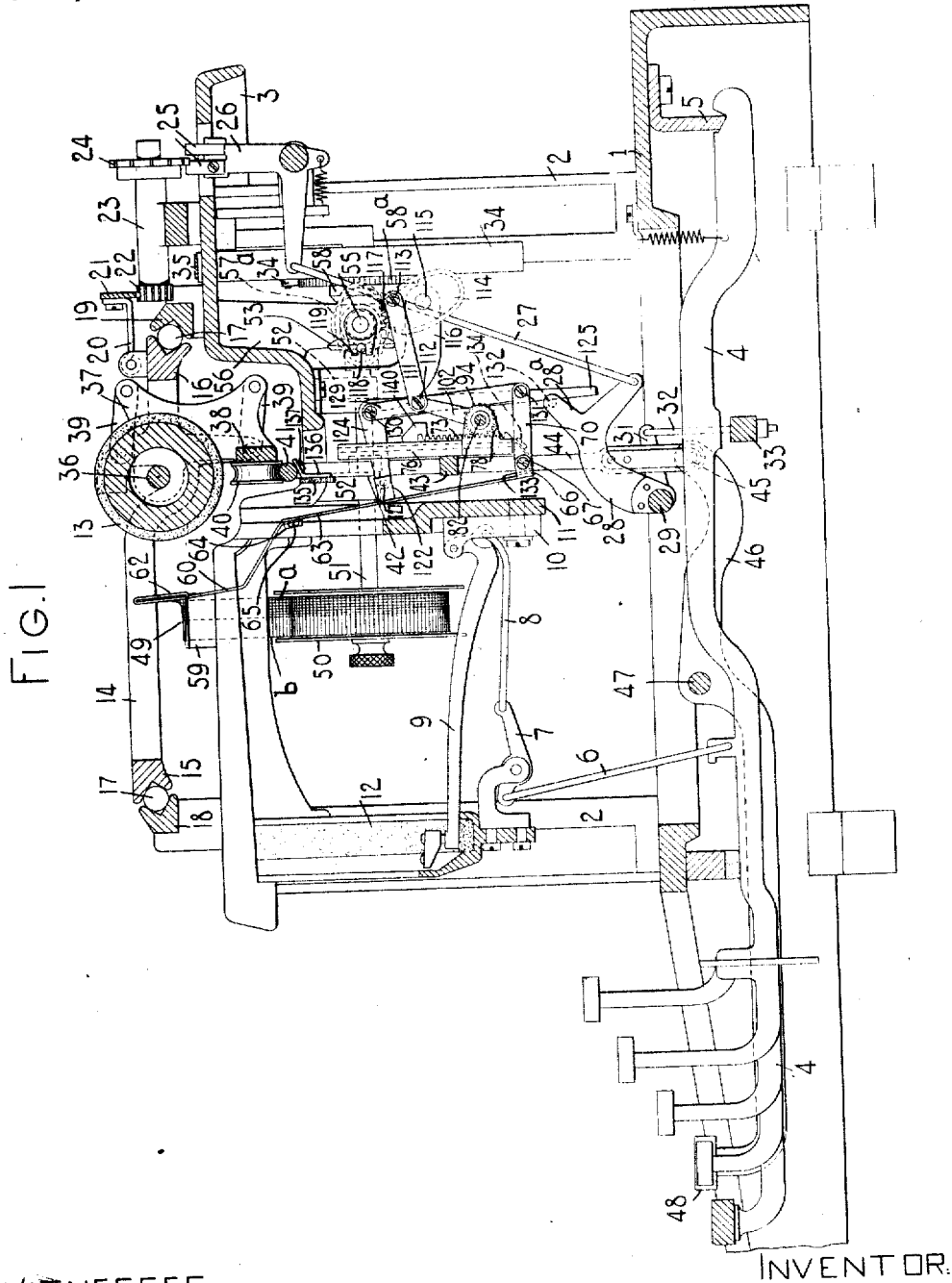
Figure 2:
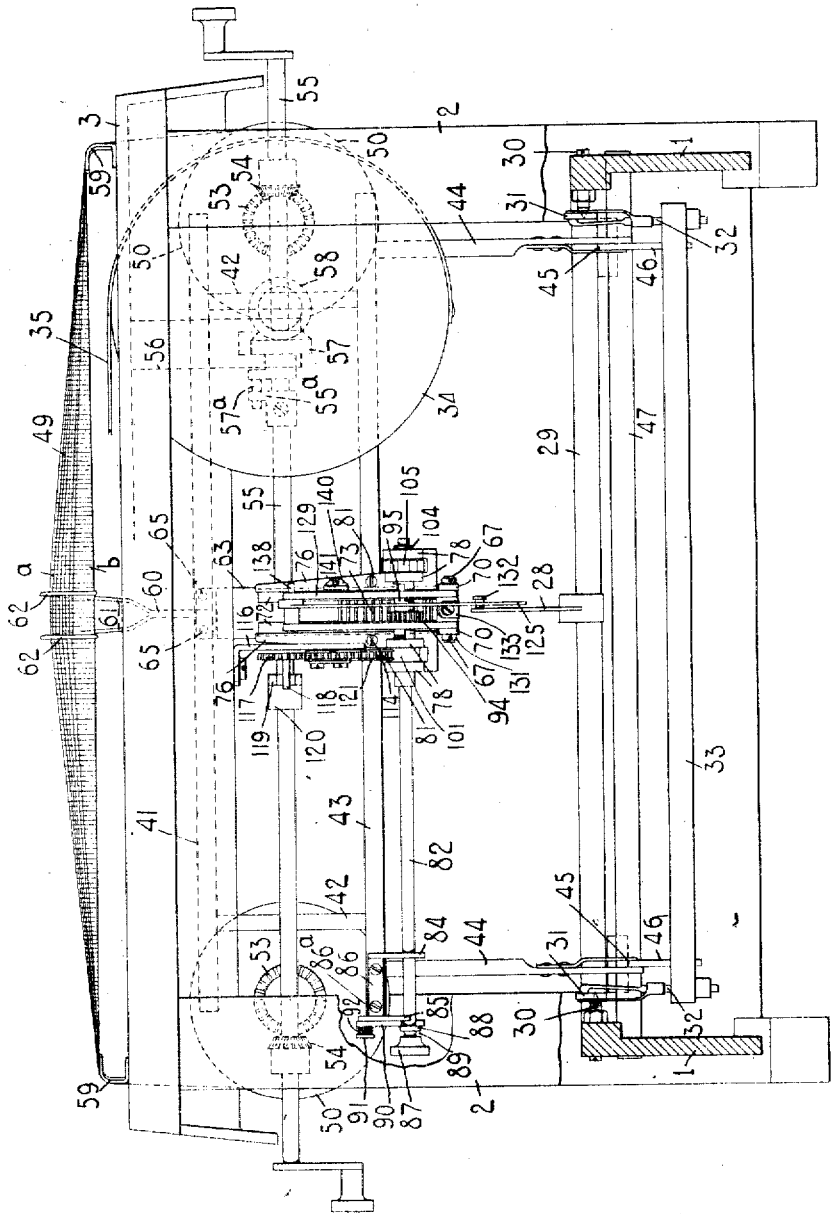
Figure 17:
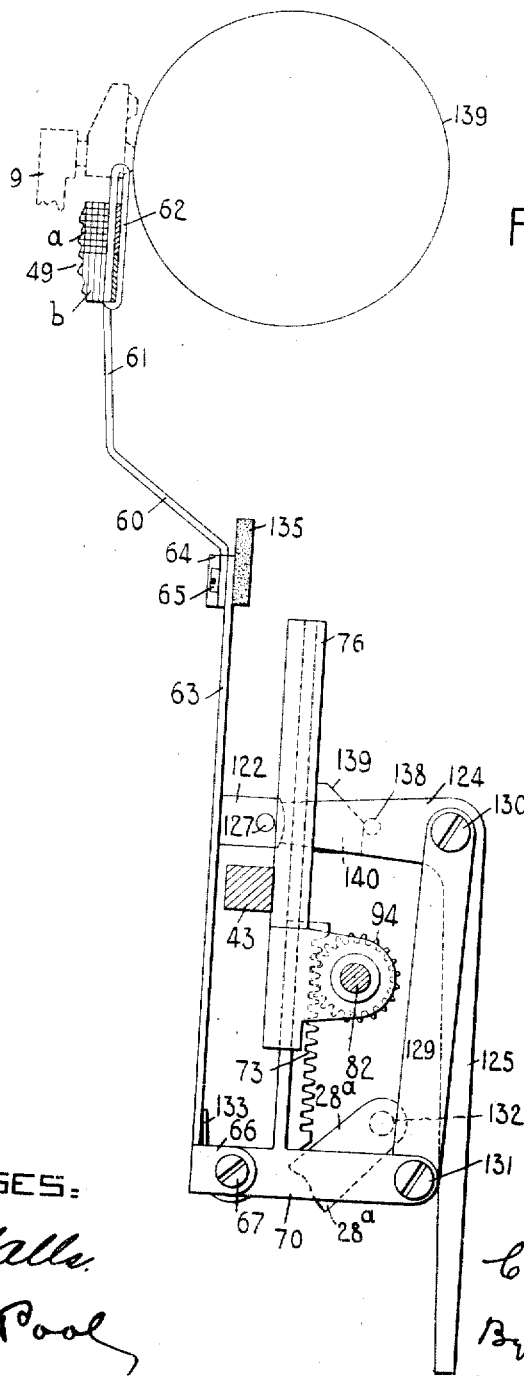

Figure 1 is a vertical front to rear sectional view taken about centrally of a typewriting machine embodying my invention, parts of the machine being omitted. Fig. 2 is a rear view of the machine, parts being omitted and parts being broken away for the sake of clearness. Fig. 3 is an enlarged fragmentary rear elevation of the vibratory ribbon carrier and its associated parts. Fig. 4 is an enlarged perspective view of one of the parts of the vibratory ribbon carrier. Figs. 5, 6 and 7 are enlarged perspective views of devices associated with the ribbon carrier for positioning it. Fig. 8 is an enlarged fragmentary rear elevation of certain of the devices employed for positioning the vibratory ribbon carrier. Fig. 9 is an end view of the parts shown in Fig. 8. Fig. 10 is a view corresponding to Fig. 8 but showing parts in different relations from those in which they appear in said Fig. 8. Fig. 11 is an end view of certain of the parts in Fig. 10. Fig. 12 is a view corresponding to Figs. 8 and 10 but showing the parts in still different relations from those shown in the other two figures. Fig. 13 is an end view of some of the parts shown in Fig. 12, certain other parts also being shown. Fig. 14 is an enlarged side elevation partly in section showing the vibratory ribbon carrier and various devices employed for positioning the same. Figs. 15, 16 and 17 are views corresponding to Fig. 14 but omitting some of the parts shown in said Fig. 14 and showing other parts in different relations from those in which they appear in said Fig. 14.

Referring first more especially to Figs. 1 and 2, the main frame of the machine is shown as comprising a base 1, corner posts 2 and a top plate 3. Key levers 4 are fulcrumed on a member 5 and are each connected by a link 6, a lever 7 and a second link 8 with a type bar 9 pivotally mounted in a hanger 10 secured to a stationary support 11, the latter being suitably fixed to the main frame of the machine. The type bars normally rest on a type rest 12 and each is provided with an upper case type and a lower case type which, when the type bars are actuated, may coöperate with the front face of a platen 13 which is adapted to rotate in a carrier presently to be described, said carrier being shiftably mounted on a carriage comprising side bars 14 and front and rear bars numbered respectively 15 and 16. The front and rear bars are grooved to coöperate with anti-friction balls 17, said balls also coöperating with grooved front and rear guide rails numbered respectively 18 and 19 which are fixed to the frame of the machine above the top plate. Arms 20 pivoted to the carriage carry a feed rack 21 which normally meshes with a feed pinion 22 fixed to the front end of a shaft (not shown), said shaft bearing in a bracket 23 secured to the top plate. An escapement wheel 24 is operatively connected with said shaft and coöperates with escapement dogs 25 mounted at the top of a dog carrier or rocker 26 which is connected by a link 27 with a curved arm 28 suitably secured to a rock shaft 29, said rock shaft being pivoted at its ends to screw pivots 30 secured on the side of the base 1. Near its ends the rock shaft is provided with rearwardly extending arms 31 from which depend arms or links 32 carrying a universal bar 33 underlying the key levers. When one of the latter is actuated to operate its associate type bar, the universal bar will be operated to cause the carriage feeding or letter feeding devices above described to coöperate in a known manner to permit the carriage to be moved a letter space toward the left under the influence of a spring drum 34 with which the carriage is connected by a band or strap 35.

The platen is provided with an axle 36 which is mounted in a carrier comprising end bars or plates 37 connected by a cross bar 38, only one of said end bars being shown. Each end bar is pivotally connected by links 39 with the side bars 14 of the carriage. A roller 40 mounted at the front of the bar 38 coöperates with a shiftable guide rail 41 which is supported near its ends on upright rods 42 movable through openings in the top plate, said rods 42 being fixed to and rising from a cross bar 43. Said cross bar, in turn, is carried by vertical rods 44 each pivotally connected at 45 with a shift lever 46 having a fixed pivot 47 intermediate its ends and terminating at the front of the machine in a key button 48. During the travel of the carriage back and forth across the top plate the relation of the platen 13 and the platen carrier with said carriage will ordinarily remain unaltered, the roller 40 running back and forth over the shift rail 41. If, however, it be desired to print in upper case one of the shift keys 48 may be depressed, raising the shift frame, comprising the rods 44, bar 43, arms 42 and shift rail 41, and thereby raising the platen carrier and platen to upper case position. The parts thus far described are not original with me and are not claimed herein save in combination with other devices presently to be described.

A ribbon 49 is secured to and wound upon ribbon spools 50, said ribbon spools being vertically disposed beneath the top plate, one at each side of the machine and forward of the platen, as shown in Figs. 1 and 2. Each ribbon spool is secured to the forward end of a horizontal shaft 51 journaled in lugs 52 depending from the top plate. Said shaft is provided at its rear end with a beveled pinion 53 which is adapted to coöperate with a beveled driving pinion 54 secured to a driving or power shaft 55 journaled in lugs 56 depending from the top plate. The driving shaft is connected with and adapted to receive motion from the spring drum 34 by a train of devices comprising beveled pinions 57 and 58 which are constantly in mesh with each other. The pinion 58 is suitably connected with the spring drum when the latter turns to draw the carriage in printing direction, as by the usual pawl 34ª and ratchet wheel 58ª (Fig. 1). The pinion 57 is slidably connected with the driving shaft 55 so that the shaft may be moved endwise to connect one or the other of the driving pinions 54 with its associate pinion 53, thereby causing the associate ribbon spool to be turned to wind the ribbon thereon. The shaft 55 may be connected with the pinion 57 so as to be turned by the latter by any suitable means, such as that illustrated in Fig. 2, said means as there shown comprising a pin 57ª rigidly connected with the pinion 57 and coöperative with an opening in a crank arm 55ª fast on the shaft 55. This mode of connecting the shaft with the driving pinion is not novel and it is not deemed necessary to describe it in detail.

The ribbon 49 is led upward from each ribbon spool through an opening in the top plate and over a pair of guide members 59 suitably secured thereto. Midway between the ribbon spools the ribbon is threaded through a vibratory ribbon carrier or vibrator, the construction of which is shown clearly in Figs. 3 and 4. Said ribbon carrier or vibrator is composed of two members adjustably secured together. The upper of said members comprises a stem 60 bifurcated at its upper end portion to provide two arms 61, the latter being bent to form loops 62 through which the ribbon is threaded, that portion of the ribbon between the loops 62 being hereinafter referred to as the printing portion of the ribbon. The lower member or part 63 of the ribbon carrier is shown detached in Fig. 4 and is in the form of an oblong flat plate which may be cut out in places as shown to lighten it. A strap or friction plate 64 is secured by screws 65 to the upper end of the member 63 and the lower end portion of the stem 60 is confined between the strap and the member 63 in such a way that when the screws are tightened the two parts of the ribbon carrier are held in a fixed relation. The lower end of the member 63 is provided with two rearwardly extending tabs or ears 66 which are perforated to receive headed shouldered screws 67, the latter serving as pivots for the ribbon carrier and engaging in tapped openings 68 formed in an extension 69 projecting forward from the lower end of a rack member or ribbon carrier support shown detached in Fig. 6. The ribbon carrier support further comprises rearwardly extending ears 70 formed with perforations 71 and upwardly extending arms 72 between which is arranged and suitably secured a rack 73. The arms 72 are provided with outwardly extending ribs or tongues 74 which are adapted to slidably engage in grooves 75 formed in the upright parallel arms 76 of a guide member which is most clearly shown in Fig. 5. The guide member is provided with a web 77 joining the lower end portions of the arms 76 forward of the grooves 75 and further comprises rearwardly extending tabs or ears 78 each of which is divided by a vertical slot or kerf 79 into two parts, the slot 79 and the outer parts of the ears 78 being laterally outside of the arms 76. The ears 78 are formed with perforations 80. The guide member is secured to the back of the cross bar 43 by screws 81, so that when the cross bar 43 is shifted during the platen shifting operation, the guide member will also be shifted. A combined slide rod and shaft 82 passes through the openings 80 and near the right-hand side of the machine bears in an opening 83 formed in one arm 84 of a U-shaped bracket (Figs. 3 and 7), which further comprises another and parallel arm 85 and a portion 86 connecting the two arms. Said bracket is secured to the rear of the bar 43 by screws 86ª. The slide rod 82 is adapted to be moved back and forth endwise and also to be given rotary movement as presently to be described, and a finger button 87 secured to its right-hand end is provided for manipulative purposes. A flange or collar 88 is formed on or secured to the slide rod near the finger button, providing a circumferential depression or groove 89 between said flange and said finger button (Fig. 3). A latch 90, clearly shown in Figs. 3 and 7, is pivoted on a shouldered screw 91 secured to the bracket arm 85. The latch is maintained pressed against the outer face of said bracket arm by a coiled spring 92 surrounding the screw 91 and said latch is provided with an open mouthed slot 93 which is adapted to coöperate with the depression 89 or with the rod 82 at the opposite side of the flange 88 in order to maintain said rod in one or another of two longitudinal positions in either of which it may be given rotary movement.

The rod 82 carries devices which control the position of the ribbon carrier support and ribbon carrier whereby different widthwise portions of the ribbon may be utilized. In one of the longitudinal positions in which the rod 82 may be set, the devices it carries operate to automatically and progressively vary the position of the ribbon carrier support and ribbon carrier so that the ribbon as it is fed longitudinally may also be fed crosswise and used progressively back and forth from one edge to the other; while in the other set position of the rod 82 the automatic crosswise feeding devices are thrown out of operation and the rod 82 is adapted to be turned by hand to one or another of a plurality of predetermined positions, thereby setting the ribbon carrier in an unvarying normal position and providing for the utilization of the ribbon in one or another of a plurality of paths parallel with each other and extending lengthwise of the ribbon. This, of course, is especially useful in two-color work. In another of the positions in which the ribbon carrier may be set by hand the ribbon is withdrawn entirely from coöperation with the types so that the latter may be employed for mimeographing or like purposes.

The connection between the rod 82 and the ribbon carrier support is made through a pinion 94, the teeth of which mesh with a rack 73 on the carrier support, said pinion being fast on a collar 95 which is fixed to the rod 82 by screws 97 (Fig. 8), said collar projecting beyond the opposite faces of the pinion 94 and being cut away at its ends to form shoulders which provide engaging faces numbered respectively 98 and 99. The engaging faces 98 are adapted to coöperate with corresponding faces 100 formed on a sleeve 101 which surrounds the rod 82 and bears in the openings in the left-hand ears or tabs 78 (Fig. 3). Arranged in the left-hand slot 79 and fast on the sleeve 101 is a crank arm 102 which is connected with the ribbon driving shaft by mechanism presently to be described. The engaging faces 99 are adapted to coöperate with corresponding faces 103 formed at the inner end of a sleeve 104 which surrounds the rod 82 and bears in the right-hand ears or tabs 78. Arranged in the right-hand slot 79 and fast on the sleeve 104 is a flange or collar 105 formed with notches 106, 107 and 108, said notches being adapted to coöperate with a spring detent 109 secured by a screw 110 to the under side of the bar 43. It will be apparent that the spring detent and the notched collar 105 will, when the rod 82 is connected with said collar, coöperate to maintain the rod 82 in any one of three positions to which it may be rotated, said positions of course being determined by the notches in the collar 105, and that the pinion 94 being thus held from turning will hold the rack 73 and maintain the carrier support and ribbon carrier in set positions normally.

The construction is such that when the rod 82 is pulled outward or to the right the engaging faces 98 and 100 will coöperate to lock the collar 95 and the sleeve 101 in a fixed relation, thereby also maintaining the sleeve 101 in a fixed relation with the rod 82. The crank arm 102 is fast on the sleeve 101 and consequently when the sleeve and the collar 95 are locked as shown in Fig. 3 any motion transmitted to the crank arm 102 from the ribbon driving shaft by mechanism presently to be described, will thence be transmitted to the pinion 94 and through it to the rack 73, the ribbon carrier support and the ribbon carrier itself. During the transmission of such motion it will be understood that the rod 82 operates as a shaft and that the sleeve 101 acts as a collar on said shaft, turning in the bearing openings in the right-hand tabs or ears 78. It will further be understood that at this time the combined rod and shaft 82 is held from longitudinal movement outward or toward the right by the sleeve 101 which in turn is held from longitudinal movement by the crank arm 102 which is confined between the two left-hand ears 78. Lengthwise movement of the rod 82 in the opposite direction is prevented by the flange 88 abutting against the outer face of the latch 90 which at this time is swung down so that the slot 93 in said latch engages with the rod 82.

When it is desired to disconnect the pinion 94 from the crank arm 102 and ribbon driving shaft the latch 90 may be swung away from the rod 82 and the rod itself may be pushed inward or toward the middle of the machine, causing the engaging faces 98 and 100 to separate and the engaging faces 99 and 103 to contact or engage; and thereby connecting the pinion 94 with the notched collar 105. During this longitudinal movement of the rod 82 the pinion 94 will remain in mesh with the rack 73, said rack being of sufficient width to permit the necessary movement of the pinion 94 from side to side. The pinion having thus been connected with the collar 105, the rod 82 may be locked from endwise movement by swinging down the latch 90 until the slot therein engages with the depression 89 as shown in Fig. 8 for example. At this time the sleeve 104 and collar 105 will be locked to the rod 82, so that any rotary movement transmitted to said rod from the finger button 87 will be communicated to the collar 105 and sleeve 104, the latter at this time being in effect fast on the rod and turning in the bearing openings in the left-hand ears or tabs 78.

Referring now to the means for transmitting motion from the ribbon driving shaft 55 to the pinion 94 this comprises a link 111 (Figs. 1, 2, 3 and 14) pivotally connected at 112 to the crank arm 102 and pivotally connected at 113 to an elliptical gear 114 pivoted at 115 to a curved arm 116 fast on the top plate 3 and extending therefrom. The elliptical gear 114 meshes with a corresponding elliptical gear 117, said gear 117 being mounted on the ribbon driving shaft 55 and being connected to turn with said shaft but in such a way that said shaft may be moved endwise independently of said gear. The connection between the gear 117 and the ribbon driving shaft comprises a pin 118 extending laterally from the gear and engaging with a slot formed in a crank arm 119, said crank arm having a collar portion 120 which is suitably secured to the shaft 55. The gear 117 is confined between two plates 121 fastened to the sides of the gear 114, said plates preventing any movement of the gear 117 lengthwise of the shaft 55. The construction is such that rotary movements communicated to the shaft 55 from the spring drum will be transmitted to the elliptical gear 117, thence to the elliptical gear 114 from which the crank arm 102 is reciprocated through the link 111, causing a rocking movement to be communicated to the combined slide rod and shaft 92. The parts are so proportioned and arranged that this rocking movement communicates to the pinion 94 alternate rotary movements in opposite directions, the extent of such movements being such as to raise the ribbon carrier support progressively and then to lower the same progressively and so on, sufficiently to make use of substantially the entire width of the ribbon as the same is fed longitudinally. The use of elliptical gears to vary the position of a vibratory ribbon carrier is not original with me and is not claimed *per se* by me.

The mechanism above described operates to vary the position of the ribbon carrier support and the ribbon carrier so that when the ribbon carrier is actuated, different widthwise portions of the ribbon will be presented to the types. The means for actuating the ribbon carrier, which will now be described, is connected to said carrier through a lug or extension 122 which is fast on and projects rearwardly from the lower part 63 of the carrier (Fig. 4). Said lug is formed with a vertical slot 123 which receives the forward end of the horizontally disposed arm 124 of a bell crank operating lever or member, said lever further comprising a vertical arm 125 and a hub portion 126. The horizontal arm of the bell crank lever is pivotally connected with the lug 122 at 127 and the hub 126 is perforated to receive a fulcrum pin 128 (Fig. 3). This fulcrum pin is secured at the upper ends of two vertically disposed supporting members or arms 129 by screws 130, the screws passing through holes in the arms and being received in tapped openings formed in the opposite ends of the fulcrum pin 128. The construction is such that the fulcrum pin and the arms 129 are rigidly secured together, the fulcrum pin serving to maintain said arms a fixed distance apart at their upper ends and the hub portion 126 being adapted to turn freely on said fulcrum pin between said arms 129. The lower ends of the members or arms 129 are formed with tapped holes to receive shouldered supporting screws 131 which pass through the bearing openings 71 on the ears 70 of the ribbon carrier support and are adapted to turn freely therein. It will be noted that both the ribbon carrier and the arms 129 are pivoted at their lower ends on the ribbon carrier support and connected above by the lug 122 and the lever arm 124, and hence are adapted to move substantially in parallelism when the ribbon carrier is vibrated. Vibratory movements are communicated to the ribbon carrier through the lever arm 125 which in turn receives its motion from a stud or pin 132 extending laterally from a lug 28ª which is integral with the curved arm 28 and extends upwardly and rearwardly from its junction therewith. It will be understood that, when any one of the key levers 4 is actuated, the rock shaft 29 will be turned and the stud 132 forced against the lever arm 125, moving the latter rearward. The upper or ribbon carrying end of the ribbon carrier is constantly urged forward away from the front face of the platen by a leaf spring 133 which is secured to the under side of the ribbon carrier support by a headed screw 134 and is curved beneath the pivotal axis of the ribbon carrier, contacting with the rear face of said carrier above said pivotal axis as shown in different views; for example, in Fig. 1. As a consequence, the ribbon carrier, when under the operative control of the key levers, is normally held away from the front face of the platen by the spring 133 as shown for example in Fig. 1, the printing portion of the ribbon being opposite or horizontally on a line with the printing point but separated or removed therefrom. When a key lever is depressed and the pin 132 acts against the lever arm 125, the operating lever is forced bodily rearward, carrying with it the ribbon carrier until the ribbon is brought close to the printing point on the platen. A pad 135 supported on an arm 136 which is secured by a headed screw 137 to the shift rail 41, is adapted to coöperate with the rear face of the part 63 and serves as a limiting stop for the ribbon carrier in its movement toward the printing point. This movement of the ribbon carrier is a rotary one, said carrier turning on the pivot screws 67 while the arms 129 turn in their bearings 71, permitting the bodily rearward movement of the bell crank operating lever. During this bodily rearward movement of the bell crank lever there may also be a slight pivotal movement thereof on the bodily moving fulcrum pin 128. At this time the pivots of the ribbon carrier and of the members or arms 129 are relatively fixed, by which is meant that they are fixed during printing operations. By reason of what may be termed the parallel motion connection between the ribbon carrier and its operating lever, and the members 129 the extent of vibratory movement communicated to said ribbon carrier will always be substantially the same, although, by reason of the up and down movement of the ribbon carrier support and the parts carried thereby, the point of engagement between the stud 132 and the lever arm 125 will vary. Such variation will take place both when the carrier support is slidably adjusted on and relatively to the guide member, and also when said support and said guide member are moved together at the times when the platen shift takes place. In other words provision is made by the described construction for always giving substantially the same extent of vibratory movement to the ribbon carrier, although the distance from the fulcrum of the operating lever at which power is applied to said lever may vary.

It will be understood that by my present invention I provide means for using the ribbon both lengthwise and crosswise so that the inked surface may be uniformly and thoroughly exhausted. Preferably this feature of my invention is employed with a ribbon having uniform characteristics throughout, although of course it may be used if desired in connection with a ribbon having longitudinal fields or stripes of different characteristics, such as the ribbon 49 shown in the drawings. Assuming that it is desired to feed the ribbon both lengthwise and crosswise the rod 82 is set in the position illustrated in Figs. 2 and 3, thereby connecting the pinion 94 with the elliptical gears 114 and 117. The operation of the parts when thus connected has already been explained but some additional features may be referred to. It will be apparent that the rack 73 and the pinion 94 not only vary the position of the ribbon carrier and its support but that they also serve to maintain said carrier and support in any of the positions to which they may be set or adjusted, this being so by reason of the fact that the pinion 94 is held from turning except when the elliptical gears are turned. By reason of the reciprocatory movements communicated to the crank arm 102 from these gears the path followed by the types lengthwise of the ribbon will be serpentine or wavy. The connection between the link 111 and the gear 114 or driven gear is such that said link passes from one side of the center of rotation of said driven gear to the other side, thus reversing the crank arm 102, when said driven gear is being moved at the fastest rate of which it is capable, that is, when the teeth nearest to the center of motion on the driven gear are in mesh with the teeth on the driving gear 117 which are farthest from the center of motion. Consequently the top and bottom portions of the curved path near the edges of the ribbon will be comparatively abrupt, while the portions between will be more gradual because of the slower rate at which the gear 114 is being driven. Figs. 1 and 14 show the elliptical gears in a relation in which the rate of crosswise feed will be comparatively slow, said figures being assumed to show the pinion 94 connected with the elliptical gears. Comparing these two figures, it will be seen that Fig. 1 shows the ribbon carrier in normal position, the ribbon being maintained separated from the front face of the platen principally by the action of the spring 133. When a printing key is actuated the stud 132 acting on the lever arm 125 is adapted to effect a bodily movement thereof, causing the arms 129 to swing on their pivotal centers 131 and the ribbon carrier to swing on its pivotal center 67 until the printing portion of the ribbon is brought close to the printing point at which time the parts will be in the relations shown in Fig. 14. On release of the printing key the operated printing key and its parts will be restored to the normal position. This same operation will take place in whatever normal position the ribbon carrier and its support may be, due to the relative movement between the rack 73 and pinion 94. As has been stated, the movement of the ribbon carrier and its support is alternately up and down and is of such extent that substantially the entire width of the ribbon will be made use of. Whatever the position of the printing portion of the ribbon may be, vertically considered, it will be apparent that the normal distance of this printing portion from the printing face of the platen will always be substantially the same and that the printing or vibratory movement of the ribbon will always be substantially the same no matter at what point along the lever arm 125 the stud 132 acts.

Reference may here be made to the fact that if at any stage of the writing the platen is shifted the cross bar 43 will be shifted also, carrying with it the guide member, the carrier support on said guide member, the carrier itself and part of the crosswise feeding devices including the crank arm 102 and the link 111. Said link will be swung upward about the pivot 113, there being enough lost motion in the connections to permit of this without affecting the gear 114. It will be apparent that the operation of the vibrating devices and the crosswise feeding devices is independent of the shift and that these devices will practically not be affected by the shift. This statement applies whether the carrier support is in the control either of the automatic or of the hand operated devices connected with the rod 82. It will further be apparent that the normal relation between the platen and the printing portion of the ribbon is the same after the platen shift as before.

When a ribbon like 49 having longitudinal stripes or fields a and b of different characteristics, said fields, for example, being of different colors as black and red respectively, is employed, it is usually desired to write on one or another of the ribbon fields at will. The first step toward this end is to shift the rod 82 so as to disconnect the pinion 94 from the crank arm 102 and connect said pinion with the collar 105 as shown in Figs. 8, 10 and 12. Assuming that the lower or red field b is to be made use of, the finger button 87 is employed to turn the combined rod and shaft 82 until the notch 106 in the collar 105 is engaged with the spring detent 109 as shown in Fig. 9. The relation at this time between the pinion 94 and the rack 73 will correspond to that shown in Fig. 16 from which it will be noted that the rack has been raised to a high point relatively to the pinion 94. The detent 109 and notch 106 coöperate to maintain the parts in this relation and thereby fix for the time being the normal position of the carrier support and ribbon carrier, said normal position of the carrier being illustrated by full lines in said Fig. 16. The depression of a printing key operates in the described manner to move the ribbon rearward to the printing point as shown by dotted lines in Fig. 16 and will present the lower or red field b to the type on the actuated type bar. The printing operation, of course, may be repeated at pleasure and the path followed by the types will be a straight one lengthwise of the field b.

When it is desired to make use of the upper or black field a of the ribbon, the finger button 87 is turned in the direction of the arrow in Fig. 8, causing the rotation of the combined rod and shaft 82 and collar 105 and disengaging the notch 106 from the detent 109. The rod 82 and collar 105 are turned until the notch 107 in said collar engages with the detent 109, at which time the parts will be in the relations shown in Figs. 10, 11 and 15. Comparing Figs. 15 and 16, it will be noted that during the turning movement of the combined rod and shaft 82 the corresponding rotary movement of the pinion 94 has operated through the rack 73 to lower the carrier support and ribbon carrier. These will be maintained in their new normal positions by reason of the engagement of the detent 109 with the notch 107. From an inspection of Fig. 15 it will be observed that the printing field of the ribbon has been lowered so that when the type bars are actuated the upper or red field a of the ribbon will be presented to the types which will follow a straight path lengthwise of said field a.

By turning the rod 82 and the parts controlled by this movement to the positions shown in Figs. 12 and 13, the notch 108 in the notched collar will engage with the detent 109 to arrest the parts in a position wherein the printing field of the ribbon will be lowered entirely out of the path of the types. During this lowering movement which, of course, is brought about by the action of the pinion 94 on the rack 73, a short pin 138 extending laterally outward from the lever arm 124 will be brought into engagement with the inclined upper edge 139 of an angled plate 140 which is secured by a screw 141 to the rear face of the left-hand upright arm 76 of the guide member. The inclined edge 139 acts on the pin 138 as a cam and forces the bell crank operating lever and the ribbon carrier rearward, overcoming the spring 133 and bringing the vibrator into contact with the pad or stop 135 as shown in Fig. 17. The vertical arm 125 of the operating lever will at the same time be moved rearward out of the path of the actuating stud 132. In Fig. 17 one of the type bars 9 is shown by dotted lines in operative position and it will be understood that the printing portion of the ribbon has not only been lowered out of the path of the types but that simultaneously the combined action of the pin 138 and cam edge 139 has moved the carrier or vibrator and the printing portion of the ribbon rearward so that they are out of the path of the bodies of the type bars and will not impede or obstruct their proper operation. By this construction the printing portion of the ribbon is movable in two directions at a single operation. Said construction adapts the invention for use in mimeograph work or other styles of work wherein it is desirable to have the types contact directly with the work sheet; nor will any unnecessary work be done in operating the vibrating mechanism since the lever arm 125 will not be engaged by the stud 132.

In order again to make use of either the upper field $a$ or lower field $b$ of the ribbon, it is only necessary to reverse the turning of the finger button 87 as above described; and when it is again desired to bring the automatic crosswise feeding devices into play the rod 82 may be shifted longitudinally outward or toward the right until the pinion 94 is again operatively connected with the crank arm 102.

Various changes may be made without departing from the spirit and scope of my invention.

What I claim as new and desire to secure by Letters Patent, is:—

1. In a typewriting machine, the combination with a platen and platen shifting devices, of means for feeding a ribbon longitudinally, a ribbon carrier, means operating to vibrate said carrier an unvarying extent at printing operation, and means operative in either position to which said platen may be shifted to control the normal position of said carrier, said controlling means including means operating automatically to give a crosswise feed to the printing portion of the ribbon.

2. In a typewriting machine, the combination with a platen and platen shifting devices, of means for feeding a ribbon longitudinally, a ribbon carrier, means operating to vibrate said carrier an unvarying extent at printing operation, and means for controlling the normal position of said carrier, said controlling means including means operating automatically to give a crosswise feed to the printing portion of the ribbon and also including means to dispense at will with said automatic means and to utilize the ribbon in parallel paths extending lengthwise thereof, said controlling means operating in either position to which said platen may be shifted.

3. In a typewriting machine, the combination with a platen and platen shifting devices, of means for feeding a ribbon longitudinally, a ribbon carrier, means for vibrating said carrier at printing operation, and means for controlling said carrier, said controlling means including means to dispense entirely with the use of the ribbon and means operating automatically to give a crosswise feed to the printing portion of the ribbon and also including means to dispense at will with said automatic means and to utilize the ribbon in parallel paths extending lengthwise of said ribbon, said controlling means operating in either position to which said platen may be shifted.

4. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and devices for effecting relative movements between said guide member and said carrier support, the vibratory printing movements of said carrier being independent of said carrier support.

5. In a typewriting machine, the combination with a platen and platen shifting means, of means for feeding a ribbon longitudinally, a ribbon carrier, means for vibrating said carrier at printing operation, a guide member operatively connected with said platen shifting means, a ribbon carrier support on said guide member, said ribbon carrier being pivoted on said support, and automatic means for effecting relative movements between said support and said guide member.

6. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and devices operative either automatically or by hand to effect relative movements between said guide member and said carrier support.

7. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and automatically operating means comprising a rack and pinion for effecting relative movements between said guide member and said carrier support.

8. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and means operating automatically to effect relative movements between said guide member and said carrier support, said automatic means including a rack fixed to said carrier support, and a pinion on said guide member adapted to be progressively turned.

9. In a typewriting machine, the combination with a power driven carriage, a platen thereon and platen shifting means, of means for feeding a ribbon longitudinally, a ribbon carrier, means for vibrating said carrier at printing operation, a guide member movable by said platen shifting means, a carrier support for said ribbon carrier, and means operating automatically to effect relative movements between said guide member and said carrier support, said automatic means including a rack, a pinion operative thereon and devices including a pair of elliptical gears connected with the carriage power and operative to drive said pinion.

10. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and means operating automatically to effect a relative movement between said guide member and said carrier support and to change the direction of such relative movement.

11. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and means operating automatically to move said carrier support on said guide member in opposite directions.

12. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and means operating automatically to move said carrier support on said guide member progressively a predetermined distance and then to reverse the direction of movement and move said carrier support progressively an equal distance in the opposite direction.

13. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and means operating automatically to effect a relative movement between said guide member and said carrier support and to change the direction of said relative movement, said last named means including a rack and pinion, a pair of elliptical gears, and connections between said pinion and said gears including a crank arm and a link.

14. In a typewriting machine, the combination with a platen and platen shifting means, of means for feeding a ribbon longitudinally, a ribbon carrier, means for vibrating said carrier at printing operation, a guide member operatively connected with said platen shifting means, a carrier support for said ribbon carrier, and devices operating either automatically or by hand to effect relative movements between said guide member and said carrier support, said devices including a rack and a pinion meshing with said rack and shiftable to be operative either automatically or by hand.

15. In a typewriting machine, the combination with a power driven carriage, a platen thereon, and platen shifting means, of means for feeding a ribbon longitudinally, a ribbon carrier, means for vibrating said carrier at printing operation, a guide member operatively connected with said platen shifting means, a carrier support for said ribbon carrier, and devices operative either automatically or by hand to effect relative movements between said guide member and said carrier support, said devices including a rack, a pinion constantly meshing with said rack, and hand controlled means for shifting said pinion to connect it with and disconnect it from the carriage power.

16. In a typewriting machine, the combination with a power driven carriage, a platen thereon, and platen shifting means, of means for feeding a ribbon longitudinally, a ribbon carrier, means for vibrating said carrier at printing operation, a guide member operatively connected with said platen shifting means, a carrier support for said ribbon carrier, and devices operative either automatically or by hand to effect relative movements between said guide member and said carrier support, said devices including a rack, a pinion constantly meshing with said rack, and a combined slide rod and shaft carrying said pinion and shiftable by hand to connect said pinion with and disconnect it from the carriage power.

17. In a typewriting machine, the combination with a power driven carriage, a platen, and platen shifting means, of means for feeding a ribbon longitudinally, a ribbon carrier, means for vibrating said carrier at printing operation, a guide member operatively connected with said platen shifting means, a carrier support for said ribbon carrier, and devices for effecting relative movements between said guide member and said carrier support including a shaft movable endwise to connect it with and disconnect it from the carriage power, said shaft being adapted to be turned in opposite directions to change the direction of relative movements between said guide member and said carrier support.

18. In a typewriting machine, the combination of printing keys, a vibratory ribbon carrier, and means for vibrating said ribbon carrier at printing operation, said means including an operating member having a shifting pivot, and means controlled by the printing keys for bodily moving said operating member and shifting its pivot.

19. In a typewriting machine, the combination of printing keys, a vibratory ribbon carrier, and means for vibrating said carrier at printing operation, said means including an operating member having a direct connection with said ribbon carrier, said operating member being movable bodily by the printing keys.

20. In a typewriting machine, the combination of printing keys, a vibratory ribbon carrier, and means for vibrating the same at printing operation, said means including an operating member, a pivoted part on which said member is pivoted, and means controlled by the printing keys for moving said pivoted part.

21. In a typewriting machine, the combination of printing keys, a vibratory ribbon carrier, an operating member therefor, a rock shaft controlled by the printing keys, and means fixed on said rock shaft and contactive with said member to operate it.

22. In a typewriting machine, the combination of printing keys, a vibratory ribbon carrier having a relatively fixed pivot, an operating member for said carrier, an arm having a relatively fixed pivot and to which said member is pivotally connected, and means controlled by the printing keys for moving said arm, operating said member and vibrating said carrier.

23. In a typewriting machine, the combination of printing keys, a vibratory ribbon carrier having a relatively fixed pivot, an operating member for said carrier, a pair of arms having relatively fixed pivots and carrying a part on which said member is fulcrumed, and means controlled by the printing keys for operating said member and vibrating said carrier.

24. In a front-strike typewriting machine, the combination of printing keys, a ribbon carrier having a relatively fixed pivot, a spring operative on said carrier and tending constantly to hold the printing portion of the ribbon away from the printing point, an operating member pivotally connected with said carrier, an arm having a relatively fixed pivot and on which said member is fulcrumed, and means controlled by the printing keys for operating said member, said arm and said carrier and overcoming said spring.

25. In a typewriting machine, the combination of ribbon spools having fixed paths of rotation, a vibratory ribbon carrier, a support for said carrier, a carrier operating member on said support, means for actuating said member at printing operation, and means for moving said support independently of said ribbon spools.

26. In a typewriting machine, the combination of ribbon spools having fixed paths of rotation, a vibratory ribbon carrier, a support for said carrier, a carrier operating member on said support, means for actuating said member at printing operation, and means independent of said ribbon spools for varying the normal position of said support.

27. In a typewriting machine, the combination of ribbon spools having fixed paths of rotation, a vibratory ribbon carrier, a support for said carrier, a carrier operating member on said support, means for actuating said member at printing operation, and means independent of said ribbon spools and operative automatically to vary the position of said support.

28. In a typewriting machine, the combination of a vibratory ribbon carrier, a support for said carrier, a carrier operating member on said support, means for actuating said member at printing operation, and means operative either automatically or by hand to vary the position of said support.

29. In a typewriting machine, the combination of ribbon spools having fixed paths of rotation, a vibratory ribbon carrier, a support on which said carrier is pivoted, an operating member pivotally mounted on said support, and means independent of said ribbon spools for changing the normal position of said support.

30. In a typewriting machine, the combination of a vibratory ribbon carrier, a support on which said carrier is pivoted, a carrier operating member, an arm pivoted on said support and on which said operating member is fulcrumed, means for actuating said operating member at printing operation, and means for moving said support.

31. In a typewriting machine, the combination of a vibratory ribbon carrier, a support on which said carrier is pivoted, a carrier operating member, a pair of arms pivoted on said support and carrying the fulcrum of said member, means for actuating said member at printing operation, and means for varying the normal position of said support.

32. In a typewriting machine, the combination of a vibratory ribbon carrier, a support on which said carrier is pivoted, a carrier operating member, a pair of arms pivoted on said support and carrying the fulcrum of said member, means for actuating said member at printing operation, and means operative either automatically or by hand for varying the normal position of said support.

33. In a typewriting machine, the combination of a vibratory ribbon carrier, a support for said carrier, a carrier operating member mounted on said support, means for actuating said member at printing operation, and means for progressively moving said support toward the printing point and also for moving it progressively in the opposite direction.

34. In a typewriting machine, the combination of a vibratory ribbon carrier, a support for said carrier, a carrier operating member mounted on said support, means for actuating said member at printing operation, and means for moving said support toward the printing point and away from the printing point, said last recited means being operative either automatically or by hand.

35. In a typewriting machine, the combination with a platen and platen shifting devices, of a vibratory ribbon carrier, a support for said carrier, said support being shiftable with said platen, a carrier operating device on said support, said carrier being mounted on said support independently of said operating device, means for actuating said operating device at printing operation, and means independent of said platen shifting devices for moving said support.

36. In a typewriting machine, the combination with a platen and platen shifting devices, of a vibratory ribbon carrier, a support for said carrier, said support being shiftable with said platen, a carrier operating device on said support, said carrier being mounted on said support independently of said operating device, means for actuating said device at printing operation, and means independent of said platen shifting devices for varying the normal position of said support.

37. In a typewriting machine, the combination with a platen and platen shifting devices, of a vibratory ribbon carrier, a support for said carrier, said support being shiftable with said platen, a carrier operating device on said support, means for actuating said operating device at printing operation, and automatic means independent of said platen shifting devices for moving said support.

38. In a typewriting machine, the combination with a platen and platen shifting devices, of a vibratory ribbon carrier, a support for said carrier, said support being shiftable with said platen, a carrier operating device on said support, means for actuating said operating device at printing operation, and means independent of said platen shifting devices and operative either automatically or by hand to vary the position of said support.

39. In a typewriting machine, the combination with a platen and platen shifting devices, of a vibratory ribbon carrier, a guide member secured to certain of said platen shifting devices, a carrier support on said guide member, said ribbon carrier being mounted on said support, a carrier operating device on said support, means for actuating said operating device at printing operation, and means for moving said support on said guide member.

40. In a typewriting machine, the combination with a platen and platen shifting devices, of a vibratory ribbon carrier, a guide member secured to certain of said platen shifting devices, a carrier support on said guide member, said ribbon carrier being mounted on said support, a carrier operating device on said support, means for actuating said operating device at printing operation, and means for moving said support on said guide member either automatically or by hand.

41. In a typewriting machine, the combination with a platen and platen shifting devices, of a vibratory ribbon carrier, a guide member secured to certain of said platen shifting devices, a carrier support on said guide member, said ribbon carrier being mounted on said support, a carrier operating device on said support, means for actuating said operating device at printing operation, and means for shifting said support on said guide member progressively toward and away from the printing point.

42. In a typewriting machine, the combination with a platen and platen shifting devices, of a vibratory ribbon carrier, a guide member secured to certain of said platen shifting devices, a carrier support on which said carrier is pivoted, a carrier operating member, an arm on said support and on which said operating member is fulcrumed, means for actuating said operating member at printing operation, and means for moving said carrier support on said guide member.

43. In a typewriting machine, the combination with a platen and platen shifting devices, of a vibratory ribbon carrier, a guide member secured to certain of said platen shifting devices, a carrier support on which said carrier is pivoted, a carrier operating member, an arm pivoted on said support and on which said operating member is fulcrumed, means for actuating said operating member at printing operation, and means for moving said carrier support on said guide member progressively toward and away from the printing point.

44. In a typewriting machine, the combination with a platen and platen shifting devices, of a vibratory ribbon carrier, a guide member secured to certain of said platen shifting devices, a carrier support on which said carrier is pivoted, a carrier operating member, an arm on said support and on which said operating member is fulcrumed, means for actuating said operating member at printing operation, and means for moving said carrier support on said guide member, said last recited means being operative either automatically or by hand.

45. In a typewriting machine, the combination of a vibratory ribbon carrier, a member or arm, said ribbon carrier and said member having pivots which are relatively fixed, and means supported on said member for moving said ribbon carrier and said member so that they are substantially parallel in all positions.

46. In a typewriting machine, the combination of a vibratory ribbon carrier, a member, said ribbon carrier and said member being pivoted and their pivots having always the same relationship one to the other, an operating member pivoted on said first recited member and connected with said ribbon carrier, and means for actuating said operating member and said ribbon carrier at printing operation so that said operating member and said ribbon carrier are always substantially parallel.

47. In a typewriting machine, the combination of printing keys, a vibratory ribbon carrier, a shiftable support on which said carrier is pivoted, a member pivoted on said support, and means mounted on said member and connected with said carrier for operating said carrier and said member when a printing key is actuated and so that said member and said carrier are substantially parallel in all positions.

48. In a typewriting machine, the combination with a platen and platen shifting devices, of a ribbon carrier, a support on which said carrier is pivoted, said support being shiftable with the platen, a member pivoted on said support, means mounted on said member for actuating said carrier and said member at printing operation and so that said member and said carrier are substantially parallel in all positions, and means independent of the platen shifting devices for varying the position of said support.

49. In a typewriting machine, the combination with a platen and platen shifting devices, of a vibratory ribbon carrier, a support on which said ribbon carrier is mounted, means mounted on said support for vibrating said carrier, means connecting said support with said platen shifting devices whereby said support is shifted when the platen is shifted, and means independent of said platen shifting devices for moving said support predetermined extents and maintaining it set in one or another of a plurality of predetermined positions.

50. In a typewriting machine, the combination with types, of a ribbon carrier which normally maintains the printing portion of the ribbon opposite the printing point, a support on which said ribbon carrier is mounted so that it may move independently thereof, and means for moving said support in a direction away from the printing point to move the printing portion of the ribbon away from the path of the types so that said types will be ineffective on said ribbon at printing operations.

51. In a typewriting machine, the combination with a platen and key operated type bars, of a vibratory ribbon carrier which normally maintains the printing portion of the ribbon opposite to but separated from the printing point on the platen, a support on which said ribbon carrier is pivoted, and means for moving said support in a direction away from the printing point and so that the ribbon will remain in inoperative position during the operation of the type bars.

52. In a typewriting machine, the combination with a platen and key operated type bars, of a vibratory ribbon carrier which normally maintains the printing portion of the ribbon opposite to but separated from the printing point on the platen, a support on which said ribbon carrier is pivoted, hand operated means for moving said support in a direction away from the printing point, and means for simultaneously swinging said ribbon carrier on its pivot toward the printing face of the platen to carry the printing portion of the ribbon out of the paths of the type bars.

53. In a typewriting machine, the combination with a platen and types, of a vibratory ribbon carrier, and means operating on the ribbon carrier to move the printing portion of the ribbon in two directions to move it away from the paths of the types and maintain said printing portion of the ribbon away from the paths of the types during printing operations.

54. In a typewriting machine, the combination with type bars, of a vibratory ribbon carrier, a spring tending constantly to move said carrier in one direction, an operating member, a device thereon, a second device coöperative at will with the first named device to overcome said spring and direct the movement of the printing portion of the ribbon away from the paths of the type bars, and hand-controlled means for bodily moving said carrier.

55. In a typewriting machine, the combination with a platen, of a vibratory ribbon carrier, a support on which said carrier is pivoted, a spring tending constantly to swing said carrier away from the platen, an arm pivoted on said support, an operating member fulcrumed on said arm and connected with said ribbon carrier, means for actuating said operating member at printing operation, a pin extending laterally from said member, a relatively fixed cam edge or face, and means for moving said support to cause said pin to coöperate with said cam face to overcome said spring.

56. In a typewriting machine, the combination with a platen and a platen shifting frame, of a guide member fixed to said frame, a carrier support slidably connected with said guide member, a ribbon carrier pivoted on said support, a pair of arms pivoted on said support and carrying a fulcrum pin, an operating member fulcrumed on said fulcrum pin and pivotally connected with said carrier, means for actuating said operating member at printing operation, a rack on said support, a coöperating pinion, a combined slide rod and shaft on which said pinion is secured, said combined rod and shaft being mounted on said guide member, automatic devices for rocking said shaft, and means for setting said shaft to connect or disconnect it from said automatic means.

57. In a typewriting machine, the combination of a ribbon carrier, a support therefor, a guide member on which said support is slidable, a rack on said support, a coöperating pinion fixed on a shouldered collar, a combined shaft and slide rod mounted on said guide member and on which said shouldered collar is fixed, automatic means for rocking said shaft, including a crank arm having a shouldered sleeve surrounding said shaft, a notched collar having a shouldered sleeve surrounding said shaft, a detent coöperative with said notched collar, means for shifting said shaft lengthwise to connect said pinion and its collar at will either with the sleeve of said crank arm or with the sleeve of said notched collar, and a latch for maintaining said combined rod or shaft in either of the lengthwise positions to which it may be shifted.

58. In a front-strike typewriting machine, the combination with a platen, of a vibratory ribbon carrier which normally maintains the printing portion of the ribbon opposite the printing point on the platen but removed or separated therefrom, a support on which said ribbon carrier is pivoted, means for bodily sliding said support progressively up and down to move the pivot of the ribbon carrier toward and away from the printing point, and means for actuating said ribbon carrier at printing operation.

59. In a front-strike typewriting machine, the combination with a platen and a carriage supporting the same, of a vibratory ribbon carrier which normally maintains the printing portion of the ribbon opposite the printing point on the platen but removed or separated therefrom, a support on which said ribbon carrier is pivoted, means for moving said support up and down either automatically or independently of the carriage by hand to vary widthwise the normal relation of the printing portion of the ribbon and the printing point, and means for actuating said ribbon carrier at printing operation.

60. In a front-strike typewriting machine, the combination of a vibratory ribbon carrier which may be swung fore and aft of the machine at printing operation and normally leaves the printing point uncovered, a ribbon driving shaft, and connections between said shaft and said carrier whereby said carrier receives progressive up and down movements from said shaft.

61. In a front-strike typewriting machine, the combination of a pivoted vibratory ribbon carrier, means for swinging said carrier toward and away from the platen substantially radially thereof at printing operation, said carrier normally leaving the printing face of the platen uncovered, a ribbon driving shaft, and means operative by said shaft for bodily shifting said carrier progressively up and down.

62. In a front-strike typewriting machine, the combination of a pivoted vibratory ribbon carrier, means for moving said carrier toward and away from the platen substantially radially thereof at printing operation, said carrier normally leaving the printing face of the platen uncovered, and hand controlled means for bodily moving said carrier up or down to one or another of a plurality of predetermined normal positions.

63. In a typewriting machine, the combination of a carriage, a vibratory ribbon carrier, a support for said carrier, and means for moving said support toward and away from the printing point, said last recited means being operative either automatically during carriage movements or independently of the carriage by hand.

Signed at the borough of Manhattan, city of New York, in the county of New York, and State of New York, this 11th day of February A. D. 1908.

CLIO B. YAW.

Witnesses:
J. B. DEEVES,
CHARLES E. SMITH.